S. BRUNSON.
Nut-Lock.
No. 162,270.  Patented April 20, 1875.
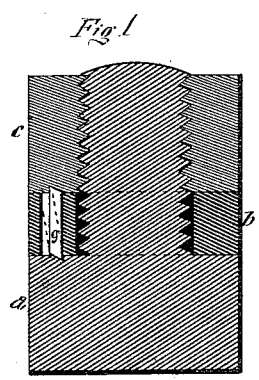
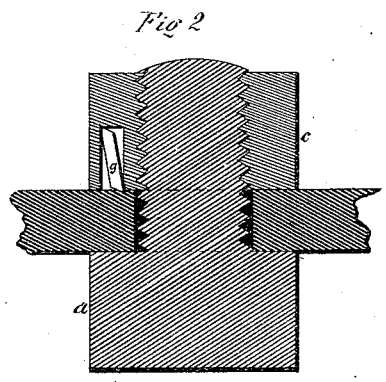
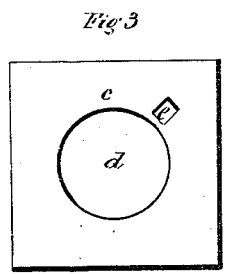
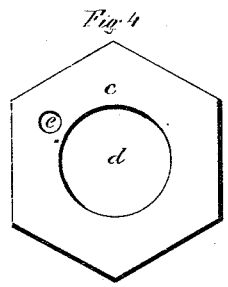
WITNESSES.
INVENTOR.
Sterne Brunson
by F. A. Lehmann
Atty

UNITED STATES PATENT OFFICE.

STERNE BRUNSON, OF BENTON HARBOR, MICHIGAN.

IMPROVEMENT IN NUT-LOCKS.

Specification forming part of Letters Patent No. 162,270, dated April 20, 1875; application filed December 15, 1874.

*To all whom it may concern:*

Be it known that I, STERNE BRUNSON, of Benton Harbor, in the county of Berrien and State of Michigan, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates to an improvement in nut-locks; and consists in a steel catch, which has both of its ends beveled upon the same plane, and which is placed in a recess in either the nut or the washer, and which allows the nut to be freely turned in one direction, but not the other.

The accompanying drawing represents my invention.

$a$ represents an ordinary screw-bolt; $b$, a washer, and $c$ the nut. The washer $b$ is of the same size as the nut, about half its thickness, and has a hole, $d$, through it slightly larger than the diameter of the screw over which it is to be placed. On a line with one of the corners, and near the hole $d$, is a round or an oblong hole, $e$, passing vertically through the washer, the dimensions of which hole are in proportion to the nut and screw to which the washer is applied. Into this hole $e$ a round or a square piece of steel or a catch, $g$, is placed, which is a little longer than the thickness of the washer, and has both ends beveled, as shown. The acute-angled end of this piece of steel or catch $g$ projects above the surface of the washer, and when the nut, which has small niches cut in, or is roughened on its under side, is screwed down, the slanting or beveled end of the catch $g$ allows it to be turned in the direction of the slant; but when an attempt is made to unscrew the nut the projecting end of the catch catches against the under side of the nut and locks it, so that it can be removed only by a force sufficient to break off the point of the catch. Both ends of the catch being beveled, the reversed motion of the nut lifts the catch, and causes it thereby to stand upon its lower end, which at the same time raises the upper point above the surface of the washer; and checks the backward motion of the nut. The catch $g$ may be placed in a hole in the nut, and answer the same purpose without the washer, but the washer is preferred.

This kind of nut-lock is chiefly applicable where it is not necessary to remove the nut frequently; but where a nut is placed to remain undisturbed, my invention will be found to give satisfaction, and offer perfect safety, since nothing short of a considerable effort can remove it.

I am aware that catches having V-shaped ends, and which stand vertically in an annular recess, and supported by springs, are not new, the same being shown in Patent No. 150,801.

Having thus described my invention, I claim—

A nut-lock consisting of the catch $g$, having both its ends beveled upon the same plane, and placed in a recess which is large enough to allow it to assume an inclined position when the nut is being screwed on, and a vertical position when the nut is being unscrewed, substantially as shown and described.

In testimony that I claim the foregoing I have hereunto set my hand this 3d day of December, 1874.

STERNE BRUNSON.

Witnesses:
WELLS BROWNE,
ALFRED J. STROUTS.